United States Patent
Sutherland et al.

(10) Patent No.: US 8,321,937 B2
(45) Date of Patent: Nov. 27, 2012

(54) METHODS AND SYSTEM FOR DETERMINING PERFORMANCE OF FILTERS IN A COMPUTER INTRUSION PREVENTION DETECTION SYSTEM

(75) Inventors: Blake Stanton Sutherland, Stittsville (CA); William G. McGee, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 572 days.

(21) Appl. No.: 12/256,383

(22) Filed: Oct. 22, 2008

(65) Prior Publication Data
US 2009/0172818 A1    Jul. 2, 2009

Related U.S. Application Data

(60) Provisional application No. 60/989,937, filed on Nov. 25, 2007.

(51) Int. Cl.
*G06F 21/00* (2006.01)
(52) U.S. Cl. ............... 726/23; 713/1; 713/100; 726/22; 726/24; 726/25; 382/155; 382/156; 382/157; 382/158; 382/159; 382/160
(58) Field of Classification Search ............ 713/1, 100; 726/22–25; 382/155–160
See application file for complete search history.

(56) References Cited

U.S. PATENT DOCUMENTS

| | | | |
|---|---|---|---|
| 6,523,016 B1 * | 2/2003 | Michalski ..................... | 706/12 |
| 7,331,061 B1 * | 2/2008 | Ramsey et al. ................ | 726/23 |
| 7,624,447 B1 * | 11/2009 | Horowitz et al. ............... | 726/23 |
| 7,656,810 B2 * | 2/2010 | Horton et al. ................. | 370/242 |
| 7,966,659 B1 * | 6/2011 | Wilkinson et al. ............. | 726/22 |
| 2002/0026503 A1 * | 2/2002 | Bendinelli et al. ............ | 709/220 |
| 2002/0087882 A1 * | 7/2002 | Schneier et al. .............. | 713/201 |
| 2003/0009693 A1 * | 1/2003 | Brock et al. .................. | 713/201 |
| 2005/0257269 A1 | 11/2005 | Chari et al. | |

(Continued)

OTHER PUBLICATIONS

"Citadel to Provide Security Industry's First Usage Based Pricing Model for Vulnerability Management", Business Wire, Feb. 7, 2005 published by bNET, CNET Networks Business, http://findarticles.com/p/articles/mi_m0EIN/is_2005_Feb_7/ai_n9494444.

(Continued)

*Primary Examiner* — Carl Colin
*Assistant Examiner* — Phillip Auger
(74) *Attorney, Agent, or Firm* — IP-MEX Inc.; Victoria Donnelly

(57) ABSTRACT

An intrusion prevention/detection system filter (IPS filter) performance evaluation is provided. The performance evaluation is performed at both the security center and at the customer sites to derive a base confidence score and local confidence scores. Existence of new vulnerability is disclosed and its attributes are used in the generation of new IPS filter or updates. The generated IPS filter is first tested to determine its base confidence score from test confidence attributes prior to deploying it to a customer site. A deep security manager and deep security agent, at the customer site, collect local confidence attributes that are used for determining the local confidence score. The local confidence score and the base confidence score are aggregated to form a global confidence score. The local and global confidence scores are then compared to deployment thresholds to determine whether the IPS filter should be deployed in prevention or detection mode or sent back to the security center for improvement.

21 Claims, 3 Drawing Sheets

U.S. PATENT DOCUMENTS

| | | | |
|---|---|---|---|
| 2005/0273854 A1* | 12/2005 | Chess et al. | 726/22 |
| 2006/0072573 A1* | 4/2006 | Broberg et al. | 370/392 |
| 2006/0242706 A1* | 10/2006 | Ross | 726/23 |
| 2006/0282388 A1 | 12/2006 | Solomon et al. | |
| 2007/0064617 A1* | 3/2007 | Reves | 370/252 |
| 2007/0143851 A1* | 6/2007 | Nicodemus et al. | 726/25 |
| 2007/0283441 A1* | 12/2007 | Cole et al. | 726/25 |
| 2009/0106842 A1* | 4/2009 | Durie | 726/25 |

OTHER PUBLICATIONS

"Citadel to Adopt Usage-Based Pricing for Hercules Vulnerability Remediation Software" by Wayne Rush, Mar. 6, 2005, "eWeek.com" http ://www.eweek.com/c/a/Security/Citadel-to-Adopt-UsageBased-Pricing-for-Hercules-Vulnerability-Remediation-Software/.

* cited by examiner

METHODS AND SYSTEM FOR DETERMINING PERFORMANCE OF FILTERS IN A COMPUTER INTRUSION PREVENTION DETECTION SYSTEM

RELATED APPLICATIONS

The present application claims priority from the USP provisional application to Sutherland, Blake, Ser. No. 60/989,937 filed on Nov. 25, 2007 entitled "METHODS AND SYSTEM FOR DETERMINING PERFORMANCE OF FILTERS/RULES IN A COMPUTER I INTRUSION PREVENTION/DETECTION SYSTEM", which is incorporated herein by reference.

FIELD OF THE INVENTION

The present patent application relates to computer security systems, and in particular, to improved methods and system for determining performance of computer Intrusion Prevention/Detection system (IPS) employing IPS filters or rules

BACKGROUND OF THE INVENTION

Because controls of an Intrusion Prevention/Detection system, like all other types of controls, have the potential to have unintended negative consequences, security and operational administrators of such systems have to make several important decisions, namely:
 a. Should a particular IPS filter be used or not; and
 b. Should an IPS filter be used in protection mode or just a detection mode.

Since often the IPS filter to be employed in an IPS does not have a chance to be thoroughly examined in all potential usage scenarios before it is needed, the more information can be provided regarding this IPS filter, the more effective decisions can be made about the deployment of the IPS filter and its associated risks.

Accordingly, there is a need in the industry for the development of improved methods and system for determining performance of the IPS filter prior and during its use as part of a intrusion detection and protection.

SUMMARY OF THE INVENTION

Therefore, there is an object of the present invention to provide methods and system for determining performance of an IPS filter employed in a computer Intrusion Prevention/Detection system.

The methods of the embodiment of the present invention provide a quantitative measurement or a set of quantitative measurements that allow organizations to make a determination on the likelihood that an IPS filter would perform as expected; and to adjust the scoring of the IPS filter based on their own experience with the IPS filter.

The measurement(s) are based on confidence attributes, which reflect the performance of an IPS filter (accuracy, i.e. repeatability and reproducibility) both from a desirable ability of the IPS filter to stop attacks, and also from an undesirable ability of the IPS filter to stop legitimate business activity. In the end, an organization wants high confidence that an IPS filter will stop attacks, while not blocking legitimate traffic or raising false alarms.

The present patent application focuses on the breadth of measurable confidence attributes of the IPS filter and the Organization/Environment, which will dictate the level of confidence in the use of a IPS filter, including:

(a) False negatives as well as false positives (and their relationship);
 (b) The length of time a filter has been used;
 (c) The amount of traffic a filter has processed;
 (d) Accuracy and evasion measures;
 (e) The number of unique environments it is being used in (both by target type i.e. mail server vs. web server as well as customer environment, i.e. customer A and customer B)
 (f) The types of applications that it may apply to;
 (g) Peer review and assessment of the IPS filter;
 (h) Relative cost that an organization places on a False Positive vs. a False Negative both generally and also for a specific asset or application.

In a first aspect of the present invention, a method for determining a performance level of an Intrusion prevention/detection system filter (IPS filter) is disclosed, the method comprising:
 collecting test confidence attributes of the IPS filter at a server computer during testing;
 determining a base confidence score of the IPS filter based on the collected test confidence attributes;
 deploying the IPS filter to a remote location;
 collecting local confidence attributes of the IPS filter at the remote location;
 determining a local confidence score of the IPS filter based on the collected local confidence attributes; and
 determining a global confidence score of the IPS filter, indicating the performance level of the IPS filter, based on the base confidence score and the local confidence score of the IPS filter.

The method further comprises determining the performance level of the IPS filter by comparing one or more of the global confidence score and the local confidence score of the IPS filter with one or more predetermined thresholds.

Additionally, the method further comprises deploying the IPS filter in an intrusion prevention mode when one of the global confidence score or the local confidence score of the IPS filter is lower than a predetermined prevention threshold.

Yet additionally, the method further comprises deploying the IPS filter in an intrusion detection mode when one of the global confidence score or the local confidence score of the IPS filter is lower than a predetermined detection threshold and higher than a predetermined prevention threshold.

Advantageously he method further comprise terminating the deployment of the IPS filter when one of the global confidence score or the local confidence score of the IPS filter is higher than a predetermined detection threshold.

Beneficially, the method further comprises updating attributes of the IPS filter at the server computer when the global confidence score is higher than a predetermined threshold.

In one modification, the test confidence attributes or the local confidence attributes of the IPS filter are selected from the group consisting of:
 a number of packets processed by the IPS filter;
 a number of streams processed by the IPS filter;
 a number of connections processed by the IPS filter;
 a number of intrusion detections identified by the IPS filter;
 a number of false positive detections made by the IPS filter; and
 a number of false negative observations made by the IPS filter;
the confidence attributes of the IPS filter being collected over a number of rule days expressed as a number of days during which the IPS filter has been in operation multiplied by a number of computers in which the IPS filter has been deployed.

In a further modification, the IPS filter is deployed in a plurality of locations and wherein the global confidence score is calculated from the base confidence score and the local confidence scores calculated at said plurality of locations.

In another aspect of the present invention, a method for deploying a software filter in an intrusion prevention/detection system (IPS filter), is disclosed, the method comprising:
- receiving an IPS filter along with a base confidence score, indicating a test performance of the IPS filter, at a server computer in a remote site for deployment at one or more host computers in said remote site;
- collecting local confidence attributes at the server computer and said one or more host computers to determine a local confidence score of the IPS filter based on the collected local confidence attributes;
- determining a global confidence score of the IPS filter based on the base confidence score and the local confidence score of the IPS filter; and
- deploying the IPS filter in a selected mode of operation based on the global confidence score and the local confidence score.

The deploying step further comprises deploying the IPS filter in an intrusion prevention mode when the local confidence score is lower than a predetermined prevention threshold.

Additionally, the deploying step further comprises:
- deploying the IPS filter in an intrusion detection mode when the local confidence score is lower than a predetermined detection threshold and higher than a predetermined prevention threshold; and
terminating deployment of the IPS filter when the local confidence score is higher than the predetermined detection threshold.

The method also further comprises: updating the IPS filter at a security center when the global confidence score is superior to a predetermined threshold.

Yet additionally the test confidence attributes or the local confidence attributes of the IPS filter are selected from the group consisting of:
- a number of packets processed by the IPS filter;
- a number of streams processed by the IPS filter;
- a number of connections processed by the IPS filter;
- a number of intrusion detections identified by the IPS filter;
- a number of false positive detections made by the IPS filter; and
- a number of false negative observations made by the IPS filter;
the attributes of the IPS filter being collected over a predetermined period of time during an operation of the IPS filter.

Advantageously, the local confidence score is calculated from a selected set of confidence attributes collected by the IPS filter over a number of rule days wherein said rule days are calculated from a number of computers in which the IPS filter has been deployed and from a number of days during which the IPS filter has been deployed in said computers.

Beneficially, the method further comprises
- deploying the IPS filter at a plurality of remote sites;
- collecting the local confidence scores across the plurality of remote sites; and
- updating the global confidence score based on the base confidence score and the local confidence scores collected across the plurality of remote sites.

In another aspect of the present invention, a computer readable medium, comprising a computer code instructions stored thereon, which, when executed by a computer, perform the methods of the present invention is disclosed.

In a further aspect of the present invention, a system for determining a performance level of a software filter in an intrusion prevention/detection system (IPS filter) is disclosed, the system comprises:
- a server computer, having a processor and a computer readable medium, having computer readable instructions stored thereon for execution by the processor, to form the following modules:
- a filter generation module, creating confidence attributes for the IPS filter;
- a quality assurance module, performing tests on the IPS filter to determine test confidence attributes for the IPS filter;
- a confidence score calculation module, determining a base confidence score of the IPS filter based on the test confidence attributes;
- a database stored in the computer readable medium, storing the confidence attributes of the IPS filter and the base confidence score of the IPS filter, the database being operably connected to said filter generation module and to the confidence score calculation module; and
- an interface module, operably connected to said database, sending the confidence attributes and the base confidence score of the IPS filter to one or more remote sites.

The system further comprises:
- a server computer at said one or more remote sites, receiving the confidence attributes and the base confidence score of the IPS filter, and deploying the IPS filter at one or more host computers;
- a local confidence score calculation module, operably connected to said one or more host computers, for collecting local confidence attributes of the IPS filter at the host computers and calculating a local confidence score of the IPS filter; and
- a deployment mode determination module operably connected to the local confidence score calculation module, for determining a mode of deployment of the IPS filter based on the local confidence score, the base confidence score or a combination thereof;
- the local confidence score calculation module and the deployment mode determination module comprising computer readable instructions stored in a computer readable medium.

Additionally, the deployment mode determination module comprises:
- a protection mode confidence test module for setting the deployment mode to protection mode when the local confidence score is lower than a predetermined protection threshold;
- a detection mode confidence test module for setting the deployment mode to detection mode when the local confidence score is lower than a predetermined detection threshold and higher than the predetermined protection threshold; and
an alerting module for generating an alert message for terminating a deployment of the IPS filter at said remote site when the local confidence score is higher than the predetermined detection threshold.

Advantageously, The system further comprises a global score calculation module for determining a global confidence score based on the base confidence score and one or more local confidence scores calculated at said one or more remote sites.

In one modification, the base confidence score calculation module and the local confidence score calculation module estimate respectively the base confidence score and the local confidence score based on a number of selected confidence attributes detected by the IPS filter and the number of rule days; the rule days being calculated from a number of computers in which the IPS filter is deployed and from a number of days during which the IPS filter is deployed in said computers.

As a result, improved methods and system for determining performance of the IPS filters are provided in this application.

BRIEF DESCRIPTION OF THE DRAWINGS

The embodiments of the invention will now be described, by way of example, with reference to the accompanying drawings in which.

EMBODIMENTS OF THE INVENTION

Definitions

False positive is any instance of a filter triggering on network traffic that would be considered benign or otherwise non malicious;

A rule day is the length of period, measured in days per host that a specific filter is deployed either in detection or prevention mode. For example, a filter X deployed at customer A on one host for 10 days is equivalent to 10 rule days. The different filter Y deployed at customer B on two hosts for 5 days would also be 10 rule days. Similarly filter Z deployed at 2 customers C and D on 5 hosts each for one day would also equate to 10 rule days; and "false positives per day"=# of false positives(reported for specific filter)/# of rule days (reported for specific filter).

Figure 1:
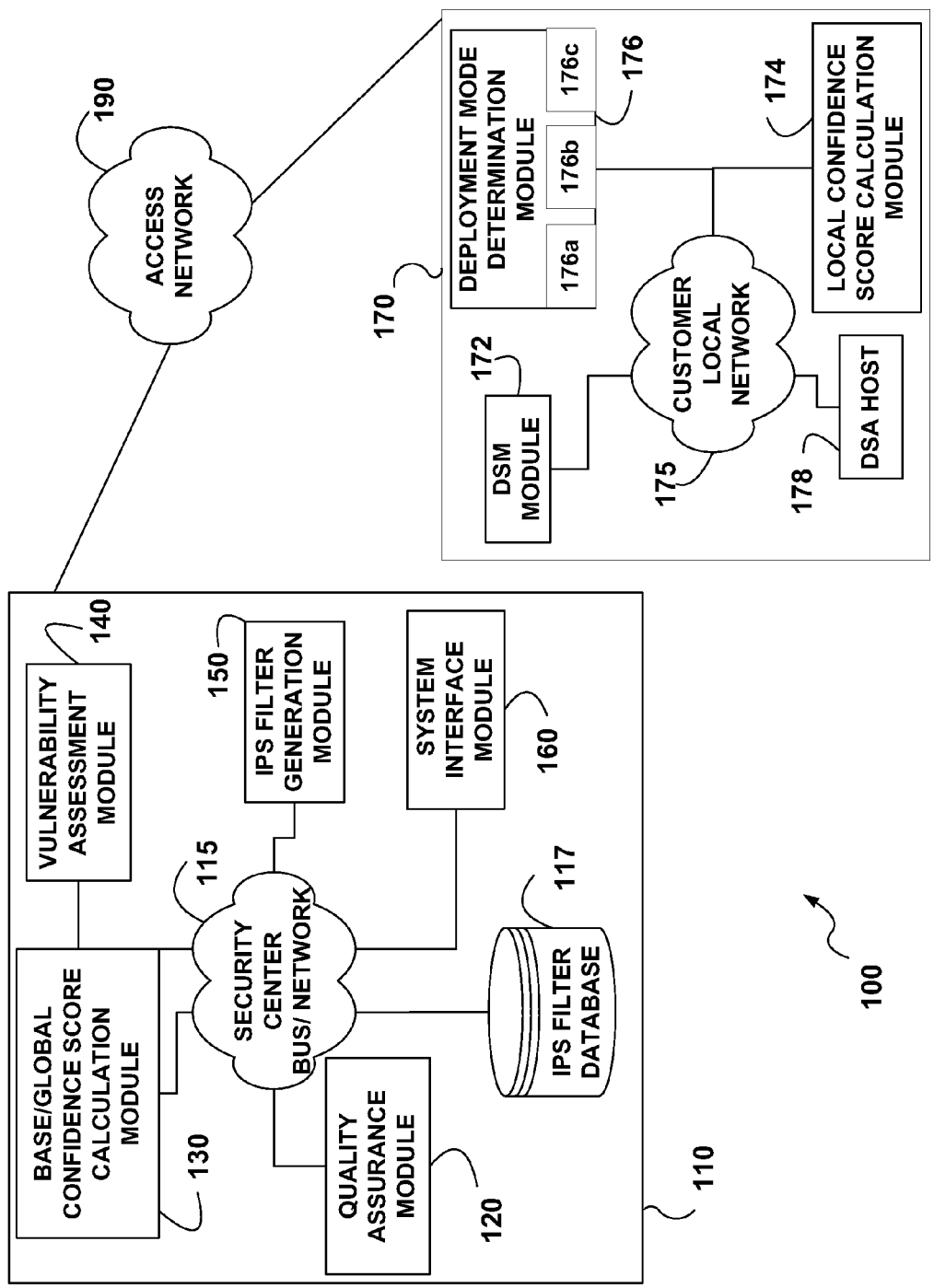
FIG. 1 illustrates a system for determining performance of filters in a computer intrusion prevention/detection system according to the embodiment of the present invention.

A system 100 for determining performance of an IPS filter in a computer intrusion prevention/detection system according to the embodiment of the present invention is illustrated in FIG. 1. The system 100 includes a Security Center 110 connected to a customer site 170 through an access network 190. Although FIG. 1 shows only one customer site 170, it is understood that the Security Center 110 can be connected to a plurality of remote locations or sites.

The access network 190 can be a public network such as the Internet, the PSTN (Public Switched Telephone network) or a wireless network. It can also be a virtual private network (VPN) or any type of network providing interconnectivity between different sites.

The security center 110, in one embodiment, comprises a server computer having a processor and a computer readable medium, e.g., volatile and/or non-volatile memory, magnetic and optical storage devices, such as hard drives, DVD, CD-ROM. A server bus is represented in FIG. 1 as Security center Bus/Network 115. The computer readable medium of the security center 110 comprises computer readable code stored thereon for execution by the processor to form quality assurance module 120, base/global confidence score calculation module 130, vulnerability assessment module 140, IPS filter generation module 150, system interface module 160, and an IPS filter database 117 as will be described in detail below.

Alternatively, the security center 110 can be a network of processing entities, each running on its dedicated computer, which are interconnected by a network herein represented by the security center bus/network 115.

As shown in FIG. 1, the system 100 further includes a customer DSM (deep security manager) module 172, a deployment mode determination module 176, a local confidence score calculation module 174, a DSA (deep security agent) host 178, and a customer local network 175 interconnecting all modules at the customer site 170.

The vulnerability assessment module 140 is provided to receive information about the existence of vulnerability in the system 100 from a vulnerability disclosure source (not shown) and to assess the vulnerability. The vulnerability disclosure source can include, for example, public and private sources, software vendors, IPS vendors, IPS providers or attackers announcing a new vulnerability attack for publicity purposes, or other sources. The vulnerability assessment module 140 collects certain attributes of the vulnerability such as its impact, e.g. denial of service, crash of the system, destruction of data, etc., targeted product, category, location of vulnerable code or other. The collected attributes are stored in a vulnerability database (not shown). The vulnerability assessment module 140 then assesses the vulnerability based on the collected attributes and determines whether the vulnerability can be mitigated or defended.

The IPS filter generation module 150 generates a set of rules including attributes, which are included in a software patch that can mitigate the vulnerability, the software patch to be referred to herein as an IPS filter, or IPS filter/rules.

The IPS filter attributes are stored in the IPS filter database 117, which is stored on a computer readable medium such as memory. The IPS filter database 117 as well as the vulnerability database can be any commercial off the shelf, e.g. Access, Oracle, etc., or proprietary database.

The system interface module 160 is provided to interface the DSM module 172. The system interface module 160 is enabled to send the IPS filter attributes to the DSM module 172 and to receive feedback from the DSM module 172. For example, the system interface module 160 receives feedback related to confidence scores and attributes of the IPS filter calculated and collected at the customer site 170 as will be described in more detail with reference to FIG. 2 below.

In the embodiment of the present invention, performance testing at the security center 110 is performed by the quality assurance (QA) module 120. The quality assurance module 120 tests the IPS filter generated by the IPS filter generation module 150 by measuring the following confidence attributes of the IPS filter under test (these attributes to be referred to as test confidence attributes):

a number of packets processed by the IPS filter;
a number of streams processed by the IPS filter;
a number of connections processed by the IPS filter;
a number of detections by the IPS filter and number of false positive detections made by the IPS filter.

In the present application, a connection is the successful completion of necessary arrangements according to a specified protocol so that one external endpoint (e.g. computer or other terminal) can communicate through a network to another endpoint (e.g. computer or terminal running a DSA agent) within the customer local network 175.

A stream can be defined as a sequence of packets used to transmit or receive information. For example, a sequence of packets generated from the same media file can be considered a stream.

Various other test attributes can also be collected as the test confidence attributes. The QA module 120 generates test traffic, or uses a real traffic from a test network, and monitors the IPS filter in operation to measure the test confidence attributes.

The base/global confidence score calculation module 130 calculates a base confidence score from the test confidence attributes measured by the QA module 120 over the number of rule days, for example. The base/global confidence score calculation module 130 stores the base confidence scores in the IPS filter database 117 along with the IPS filter attributes. By way of example, the base confidence scores calculated by the base/global confidence score calculation module 130 include the following:

> Probability of false positive (per packet analyzed)=a number of false positive detections (FPD)/a number of packets processed by the IPS filter×100;
>
> Probability of false positive (per stream analyzed)=a number of false positive detections (FPD)/a number of streams processed by the IPS filter×100;
>
> Probability of false positive (per connection analyzed)=a number of false positive detections (FPD)/a number of sessions processed by the IPS filter×100; and Probability of false positives per rule day.

In the present application, a session is defined as a lasting connection between the external endpoint and the computer running a DSA agent usually involving the exchange of many packets between them. The session begins when the connection is established at both ends and terminates when the connection is ended.

The base confidence score constitutes a measure of the level of performance of the IPS filter, with a low base confidence score indicative of an IPS filter with high performance, i.e. not likely triggering false positives. The base/global confidence score calculation module 130 also calculates a global confidence score from the base confidence score and local confidence scores. Local confidence scores are confidence scores calculated at remotes sites where the IPS filter is deployed as will be further described in detail below.

We will now refer back to FIG. 1 to describe the customer site 170 in more detail.

The deep security manager, or DSM, module 172 is a server computer within the customer site 170, which is enabled to communicate with the security center 110. The DSM module 172 controls the DSA hosts 178 by sending queries, and distributing security configuration to the DSA hosts 178. The DSM module 172 also includes a Recommendation Engine (not shown), which monitors processes, registries, software packages on the DSA hosts 178 and recommends rules to be used to protect the DSA hosts 178. The DSM module 172 interfaces with the security center 110 to receive updates for existing IPS filters or new IPS filters, and respective base confidence scores for the IPS filters, and to deploy the new or updated IPS filters to required vulnerable DSA hosts 178. The DSM module 172 also sends local confidence scores and attributes calculated or collected at the customer site 170 to the security center 110.

The DSA host 178 is a computer or host within the customer site 170 running a deep security agent (DSA) software. The DSA host 178 runs the IPS filter on the host and, under control of the DSM module 172, executes requests or responds to queries from the DSM module 172, and monitors and applies the configuration set by the DSM module 172 to the DSA host 178 computer.

The local confidence attributes for the IPS filter are collected at the DSM module 172 and at the DSA host 178, e.g., via manual input through a user interface (UI) (not shown), to identify and tag specific detections for example, false positives, as determined by the customer. Instead of the manual input, alternatively, local confidence attributes can be collected via automated import, or automated detection.

A set of collected local confidence attributes, or any subset thereof, is forwarded to the local confidence score calculation module 174, which determines the local confidence score for the IPS filter using local measures of local confidence attributes that are specific to the customer environment, i.e. based on local counts and incidents of false positives. Examples of determining local confidence scores will be described in accordance with FIG. 2 below.

The local confidence score and base confidence score are then forwarded to the deployment mode determination module 176, which evaluates the IPS filter as to its suitability to be used in intrusion prevention/protection mode, or intrusion detection mode based on the local confidence score and/or the global confidence score. In the case of a new IPS filter, local confidence score may not be applicable as no local collection of attributes has been done yet. For rules of the IPS filter that contain site specific configuration, the base confidence score will be zero, and only local confidence score would be used.

The deployment mode determination module 176 includes a protection mode confidence test module 176*a*, and a detection mode confidence test module 176*b*, which determine whether the IPS filter is to be deployed in an intrusion protection mode, an intrusion detection mode, or not deployed at all. The deployment mode determination module 176 further has an alert module 176*c* for generating an alert when the IPS filter does not meet the criteria for deploying in neither intrusion prevention mode nor intrusion detection mode. The test performed by these modules will be described with reference to FIGS. 2 and 3 below.

In determining the confidence scores at both the security center 110 and the customer site 170, the system 100 of the embodiment of the present invention can use a real-life traffic in a test network or emulate traffic through testing by the QA module 120. Reallife traffic can be generated, for example, by using programs such as those deployed on honeypot-enabled networks, or programs offering exposure to real traffic on a network backbone.

Additionally, replay of good traffic, i.e. network data replay of traffic known to contain normal expected information and no malicious content, can also be used as a means of testing for false positives.

Thus, the system 100 for determining a performance level of an intrusion prevention and detection filter has been described.

Figure 2:
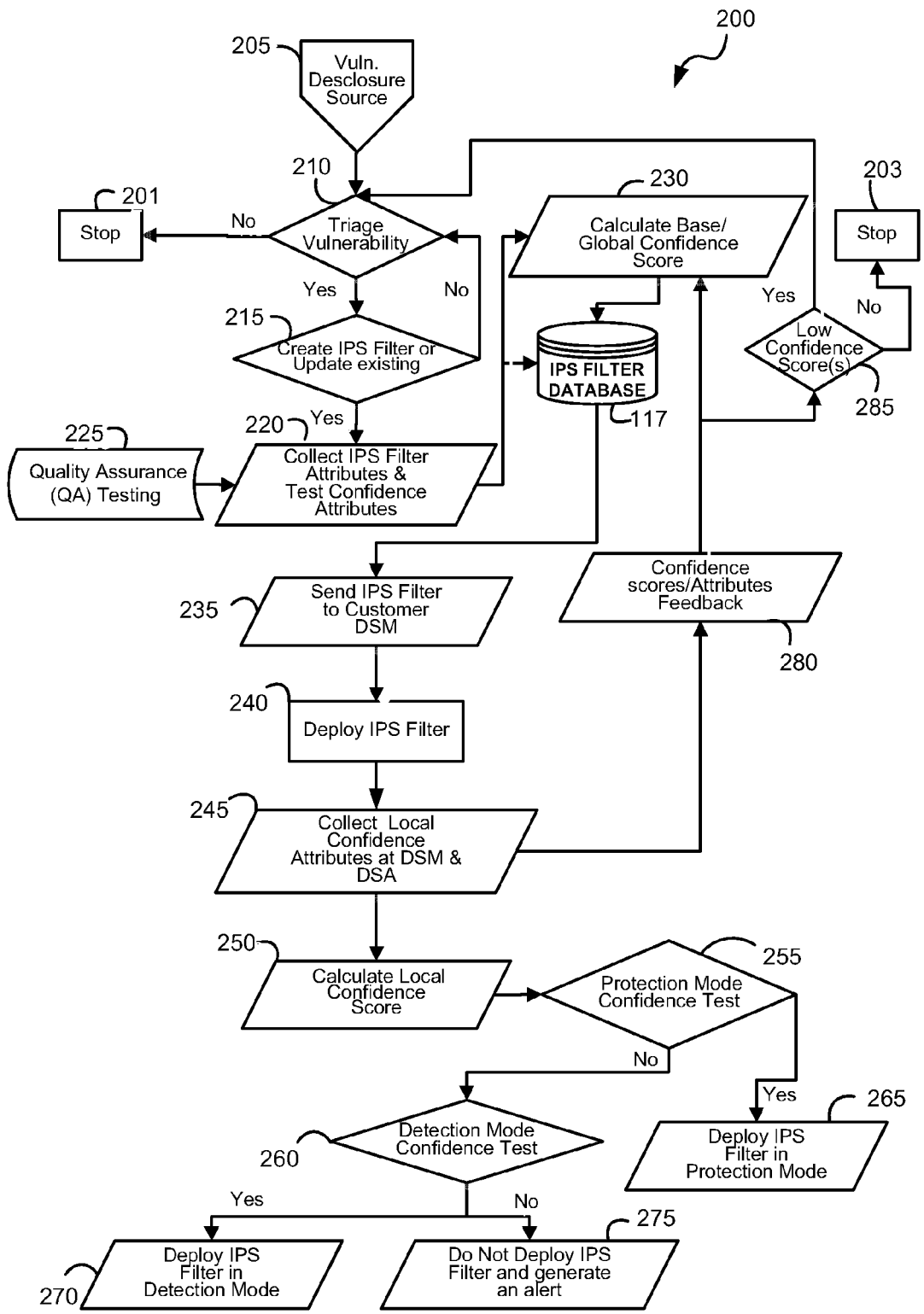
FIG. 2 shows a flowchart illustrating a method for determining performance of filters in a computer intrusion prevention/detection system according to the embodiment of the present invention.

A method for generating the IPS filter and measuring its performance level will now be described with regard to the flowchart 200 of FIG. 2.

Upon disclosing a new vulnerability from a vulnerability disclosure source at step 205, the information about the new vulnerability is forwarded to the security center 110 for analysis and processing. At the security center 110, an analysis is first performed if the new vulnerability can be defended or mitigated by performing a triage of the vulnerability at step 210. Vulnerability triage involves analyzing one or more vulnerabilities to sort their severity and to determine whether they can be mitigated. If the new vulnerability cannot be mitigated (exit "No" from step 210), the flowchart 200 is terminated (step 201). Otherwise (exit "Yes" from step 210), an attempt is made to create a new IPS filter or to update an existing IPS filter (step 215). If the attempt is not successful (exit "No" from step 215), the flowchart 200 returns back to step 210, and the steps 210, 201 and 215 are repeated a number of times until the corresponding IPS filter or its update are created. If not, the flowchart 200 is terminated after a number of attempts (termination not shown).

If the attempt to create a new IPS filter or update the existing IPS filter is successful (exit "Yes" from step 215), the new or updated IPS filter including its rules and attributes are then collected at step 220 and stored in the IPS filter database 117. At step 225, quality assurance testing is performed on the IPS filter to measure the test confidence attributes as discussed with reference to FIG. 1. The test confidence attributes are passed along with the IPS filter to the IPS filter database 117. Additionally, the base confidence score is calculated at step 230 from the test confidence attributes and stored in the IPS filter database 117.

As an illustration of the step 230, a specific example of calculation of base confidence score is adopted using the time period (rule days) during which the IPS filter has been deployed. Rules based on the packets, streams or connections could very well be used. This example considers the number of false positives per rule day generated by the IPS filter before it is released.

In this example, considering that a specific IPS filter has been deployed at t(0) for 5 days in the test network including 10 machines before release, the rule day is then 50 (50 rule days). Considering also that 1 incident was identified as part of the QA testing, then the base confidence score for the IPS filter at t(0) would be 1/50.

Going back to the flowchart 200, once the new or updated IPS filter is available at the security center 110, it is ready to be sent to a customer DSM module 172 (step 235) at the customer site 170.

The new or updated IPS filter is sent to a customer, e.g., a DSM Module 172 of a company "A" (step 235), which deploys the new or updated IPS filter to required vulnerable DSA hosts 178 (step 240). When the IPS filter is sent to the customer DSM module 172 from the security center 110, the information regarding the rules and attributes of the IPS filter along with the base confidence score is attached to or sent along with the IPS filter. As previously described, a set of local confidence attributes for the IPS filter is collected at the DSM module 172 and DSA host 178, at step 245.

At step 250, local confidence scores are calculated for the IPS filter based on the collected local confidence attributes such as local counts and incidents of false positives as previously described. These local confidence attributes are collected, while the IPS filter is in operation within the customer site 170.

Using again the example above for illustration and considering that the IPS filter is deployed at multiple remote sites each represented as customer site 170, the local confidence score at each customer site 170 is updated at t(n), 60 days after the deployment date t(0), to give the following data:
Customer A for 30 days on 100 machines has 3000 rule days;
Customer B for 60 days on 20 machines has 1200 rule days; and
Customer C for 10 days on 1000 machines has 10,000 rule days.

Considering also that the following false positive results were also reported at t(n) by the customers:
Customer A, 5 incidents;
Customer B, 2 incidents; and
Customer C, 15 incidents;
then, the following calculations are made:
The total number of incidents is: 1+5+2+15=23
The total number of rule days is: 50+3000+1200+10000=14250
Global score for filter at t(n) would then be 23/14250;
Local Customer A score would be 5/3000;
Local Customer B score would be 2/1200; and
Local Customer C score would be 15/10000.

As illustrated in these calculations, the global confidence score is a function of the base confidence score and the local confidence scores by, first, aggregating the total number of local incidents and then aggregating the total number of rule days before forming a fraction from these two numbers as illustrated in the example above. The local and global confidence scores can be represented as a fraction, numerator and denominator or a percentage, and the local and global scores can also vary over time as described above. When the base confidence score and the local confidence score at each remote site are expressed as a numerator and a denominator, then the global confidence score can be expressed as a numerator and a denominator with the numerator of the global confidence score being the sum of the numerators of the base and local confidence scores; and the denominator of the global confidence score being the sum of the denominators of the base and local confidence scores.

Now continuing on the description of the flowchart 200 and following the calculation of local confidence scores at step 250, the local confidence score and base confidence score are then selectively used by the deployment mode determination module 176 to perform a protection mode confidence test at step 255 as described with reference to FIG. 1. The protection mode confidence test of step 255 evaluates the IPS filter to determine whether to use the IPS filter in an intrusion prevention mode or intrusion detection mode based on a comparison between a prevention threshold and the global confidence score or the local confidence score. The prevention threshold can be set comparatively to the global confidence score, or local score, or both, as well as based on any subset of confidence attributes chosen by the customer, i.e. the customer may choose the prevention threshold and the attributes used therein based upon its own risk tolerance.

If the IPS filter passes the protection mode confidence test (exit "Yes" from step 255), then the IPS filter is deployed within the customer site 170 in the intrusion protection mode (step 265). If the IPS filter does not pass the protection mode confidence test (exit "No" from step 255), then the IPS filter undergoes a detection mode confidence test (step 260), i.e. the IPS filter is evaluated for use in intrusion detection mode based on the local confidence score and/or global confidence score. If the IPS filter passes the detection mode confidence test (exit "Yes" from step 260), then the IPS filter is deployed within the customer site 170 in intrusion detection mode (step 270). If not (exit "No" from step 260), the IPS filter is not deployed, and an alert is generated (step 275).

The DSM module 172 and the DSA host 178 continuously collect local confidence attributes based on the local use of the IPS filter and periodically repeats the comparison of the collected data with the protection mode confidence test and detection mode confidence test. If the global and local confidence scores for the IPS filter change, then an alert is raised either to switch the deployment of the IPS filter into the intrusion prevention mode from the intrusion detection mode, or vice versa.

During the operation of the flowchart 200, when the local confidence score calculation module 174 completes its calculations, the DSM module 172 periodically supplies this information back to the security center 110 at a confidence scores/attributes feedback (step 280). The local confidence score is then forwarded to the step 230 "Calculate base/global confidence score" to be integrated into the global confidence score for the IPS filter, based on real customer use of the IPS filter. A number of customer sites using and scoring the IPS filter would also be used in this case as shown in the example above.

Additionally, the current global confidence score for the IPS filter is compared at step 285 with one or more thresholds identifying predetermined confidence scores assigned to the IPS filter. If the current IPS filter global confidence score is lower than the one or more thresholds (i.e. a high-performing IPS filter), then no specific action is taken (exit "No" from step 285 leading to step 203). However, when the current IPS filter global confidence score is higher than the one or more thresholds (i.e. low-performing IPS filter), the flowchart 200 returns back to step 210, and the flowchart 200 is repeated again. Accordingly, two events trigger the creation of improvement to the IPS filter: a new vulnerability, or a false positive (high confidence score) results of the IPS filter in use.

Figure 3:
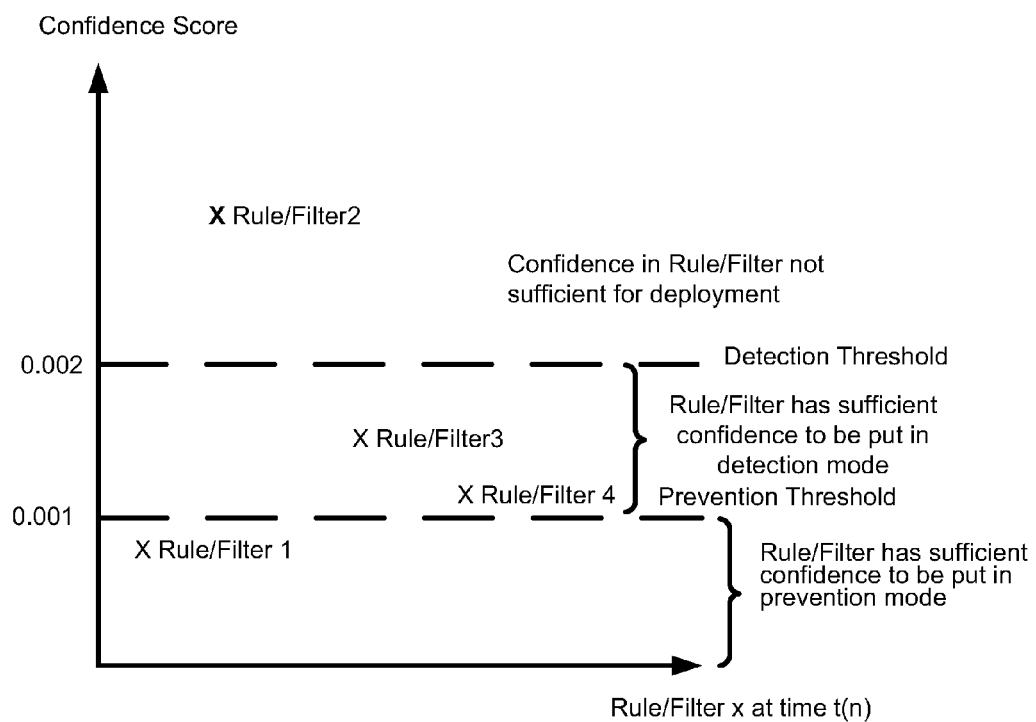
FIG. 3 shows a diagram illustrating selection of prevention and detection mode thresholds in the flowchart of FIG. 2.

FIG. 3 illustrates the operation of the deployment mode determination module 176 of FIG. 1, where one or more thresholds are being used to determine whether an IPS filter is deployed or not, and if deployed, whether it is placed in intrusion detection mode or intrusion prevention mode.

For this example, we will use the information for the customer A listed above. A simple confidence score calculation is as follows:

Local confidence score for IPS filter at t(n) is 5/3000 (or 0.00167); and
Global confidence score for IPS filter at t(n) is 23/14250 (or 0.00161).

By way of example, the prevention rule for the customer A has been selected as follows:

Local confidence score should be <=0.001 before a specific rule is deployed in intrusion prevention mode.

By way of example, the detection rule for the customer A has been selected as follows:

Local confidence score should be <=0.002 before a specific rule is deployed in intrusion detection mode.

In this example, at t(n) the rule meets the requirement, which would allow deploying the IPS filter in the intrusion detection mode, but not in the intrusion prevention mode.

In a modification to the embodiment described above, the attributes of a specific IPS filter determining the level of confidence that the IPS filter will behave as expected without negative consequences may include one or more of the following:

How many times the IPS filter has processed information (for example, measured by number of streams, or number of connections, number packets or rule days, etc) and provided desired results;
a number of software applications to which the IPS filter has been applied;
a number of hosts, on which the IPS filter has been used;
a number of customer sites using the IPS filter;
the length of time the IPS filter has been in use;
peer review of the IPS filter if it is open for inspection;
a measure of susceptibility to evasion;
a number of false positives generated by the IPS filter relative to its use (to be referred to as false positive rate);
other negative impacts, for example, CPU utilization, memory utilization etc.

Additionally, a number of false negative observations per units of measure of processed information (e.g. packet, stream, connection, rule days, etc) may also be calculated and integrated into the confidence scores.

Yet additionally, local confidence attributes of a specific environment, e.g., organization, which would impact the level of confidence for the IPS filter can be also used. These local confidence attributes may include one or more of the following:

Relative cost of a false positive versus a false negative as considered generally for the organization and with regard to a specific asset; this would allow economic differences between the cost of a false positive and a false negative to be compared, and deployment thresholds and rules to be adjusted accordingly, thus allowing organizations to find an optimal economic balance between false positives and false negatives when tuning a security control;

Relative cost of another negative measure, e.g. CPU utilization;

Software application stack on a specific host where a filter/rule is being deployed; and Versions of the software applications running on the host.

Thus, improved methods and system for determining performance of a filter in a computer intrusion prevention/detection system have been provided.

Although the embodiments of the invention have been described in detail, it will be apparent to one skilled in the art that variations and modifications to the embodiment may be made within the scope of the following claims.

The invention claimed is:

1. A method for determining a performance level of a software filter in an intrusion prevention/detection system (IPS filter), the method comprising:
    at a server computer, employing at least one processor for collecting test confidence attributes of the IPS filter characterizing a test performance of the IPS filter;
    determining a base confidence score of the IPS filter, characterizing the test performance of the IPS filter, based on the collected test confidence attributes;
    deploying the IPS filter to a remote location;
    at the remote location, employing at least one processor for collecting local confidence attributes of the IPS filter characterizing a local performance of the IPS filter at the remote location;
    determining a local confidence score of the IPS filter, characterizing the local performance of the IPS filter, based on the collected local confidence attributes; and
    determining a global confidence score of the IPS filter, indicating the performance level of the IPS filter, based on the base confidence score and the local confidence score of the IPS filter;
    wherein the IPS filter is configured to process a stream of packets.

2. The method of claim 1, further comprising determining the performance level of the IPS filter by comparing one or more of the global confidence score and the local confidence score of the IPS filter with one or more predetermined thresholds.

3. The method of claim 1, further comprising deploying the IPS filter in an intrusion prevention mode when one of the global confidence score or the local confidence score of the IPS filter is lower than a predetermined prevention threshold.

4. The method of claim 1, further comprising deploying the IPS filter in an intrusion detection mode when one of the global confidence score or the local confidence score of the IPS filter is lower than a predetermined detection threshold and higher than a predetermined prevention threshold.

5. The method of claim 1, further comprising:
   terminating the deployment of the IPS filter when one of the global confidence score or the local confidence score of the IPS filter is higher than a predetermined detection threshold.

6. The method of claim 1, further comprising updating attributes of the IPS filter at the server computer when the global confidence score is higher than a predetermined threshold.

7. The method of claim 1, wherein the test confidence attributes or the local confidence attributes of the IPS filter are selected from the group consisting of:
   a number of packets processed by the IPS filter;
   a number of streams processed by the IPS filter;
   a number of connections processed by the IPS filter;
   a number of intrusion detections identified by the IPS filter;
   a number of false positive detections made by the IPS filter; and
   a number of false negative observations made by the IPS filter;
   wherein the confidence attributes of the IPS filter being collected over a number of rule days expressed as a number of days during which the IPS filter has operated multiplied by a number of computers in which the IPS filter has been deployed.

8. The method of claim 1 wherein the IPS filter is deployed in a plurality of locations, and wherein the global confidence score is calculated from the base confidence score and the local confidence scores calculated at said plurality of locations.

9. A non-transitory computer readable storage medium, comprising computer readable instructions stored thereon, which, when executed by a computer, perform the steps of the method recited in claim 1.

10. A method for deploying a software filter in an intrusion prevention/detection system (IPS filter), the method comprising:
   receiving an IPS filter along with a base confidence score indicating a test performance of the IPS filter at a server computer, at a remote site for deploying the IPS filter at one or more host computers in said remote site;
   collecting local confidence attributes at said one or more host computers to determine a local confidence score of the IPS filter indicating a local performance of the IPS filter based on the collected local confidence attributes;
   determining a global confidence score of the IPS filter based on the base confidence score and the local confidence score of the IPS filter; and
   deploying the IPS filter at said one or more host computers in a selected mode of operation based on the global confidence score and the local confidence score.

11. The method of claim 10, wherein the deploying comprises deploying the IPS filter in an intrusion prevention mode when the local confidence score is lower than a predetermined prevention threshold.

12. The method of claim 10, wherein the deploying comprises:
   deploying the IPS filter in an intrusion detection mode when the local confidence score is lower than a predetermined detection threshold and higher than a predetermined prevention threshold; and
   terminating deployment of the IPS filter when the local confidence score is higher than the predetermined detection threshold.

13. The method of claim 10, further comprising updating the IPS filter at the server computer when the global confidence score exceeds a predetermined threshold.

14. The method of claim 10, wherein the test confidence attributes or the local confidence attributes of the IPS filter are selected from the group consisting of:
   a number of packets processed by the IPS filter;
   a number of streams processed by the IPS filter;
   a number of connections processed by the IPS filter;
   a number of intrusion detections identified by the IPS filter;
   a number of false positive detections made by the IPS filter; and
   a number of false negative observations made by the IPS filter;
   the attributes of the IPS filter being collected over a predetermined period of time during an operation of the IPS filter.

15. The method of claim 10, wherein the local confidence score is calculated from a selected set of confidence attributes collected by the IPS filter over a number of rule days, wherein said rule days are calculated from a number of computers, in which the IPS filter is deployed and from a number of days during which the IPS filter has been deployed in said computers.

16. The method of claim 10, further comprising:
   deploying the IPS filter at a plurality of remote sites;
   collecting the local confidence scores across the plurality of remote sites; and
   updating the global confidence score based on the base confidence score and the local confidence scores collected across the plurality of remote sites.

17. A system for determining a performance level of a software filter in an intrusion prevention/detection system (IPS filter), the system comprising:
   a server computer, having a processor and a non-transitory computer readable storage medium, having computer readable instructions stored thereon for execution by the processor, forming:
   a filter generation module, generating confidence attributes for the IPS filter;
   a quality assurance module, performing tests on the IPS filter to determine test confidence attributes for the IPS filter;
   a base confidence score calculation module, determining a base confidence score of the IPS filter, characterizing a test performance of the IPS filter, based on the test confidence attributes;
   a database stored in the non-transitory computer readable storage medium, storing the confidence attributes of the IPS filter and the base confidence score of the IPS filter, the database being operably connected to said filter generation module and to the base confidence score calculation module; and
   an interface module, operably connected to said database, sending the confidence attributes and the base confidence score of the IPS filter to one or more remote sites
   wherein the IPS filter is configured to process a stream of packets.

18. The system of claim 17, further comprising:
   one or more host computers at said one or more remote sites, receiving the confidence attributes and the base confidence score of the IPS filter, and deploying the IPS filter at the one or more host computers;
   a local confidence score calculation module, operably connected to said one or more host computers, for collecting local confidence attributes of the IPS filter at the host computers and calculating a local confidence score of the IPS filter, characterizing performance of the IPS filter at said one or more remote sites; and
   a deployment mode determination module operably connected to the local confidence score calculation module, for determining a mode of deployment of the IPS filter based on the local confidence score, the base confidence score or a combination thereof;

the local confidence score calculation module and the deployment mode determination module comprising computer readable instructions stored in a non-transitory computer readable storage medium for execution by a processor.

19. The system of claim 18, wherein the deployment mode determination module comprises:
- a protection mode confidence test module for setting the deployment mode to a protection mode when the local confidence score is lower than a predetermined prevention threshold;
- a detection mode confidence test module for setting the deployment mode to a detection mode when the local confidence score is lower than a predetermined detection threshold and higher than the predetermined prevention threshold; and
- an alerting module for generating an alert message for terminating a deployment of the IPS filter at said remote site when the local confidence score is higher than the predetermined detection threshold.

20. The system of claim 18, wherein the base confidence score calculation module and the local confidence score calculation module comprises computer readable instructions stored in a non-transitory computer readable medium causing a processor to estimate respectively the base confidence score and the local confidence score based on a number of selected confidence attributes detected by the IPS filter and the number of rule days, the rule days being calculated from a number of computers in which the IPS filter is deployed and from a number of days during which the IPS filter has been deployed in said computers.

21. The system of claim 17, further comprising a global score calculation module for determining a global confidence score based on the base confidence score and one or more local confidence scores calculated at said one or more remote sites.

* * * * *